Nov. 25, 1958     C. E. NYBLOM     2,861,850
WHEEL AND AXLE ASSEMBLY
Filed March 16, 1956
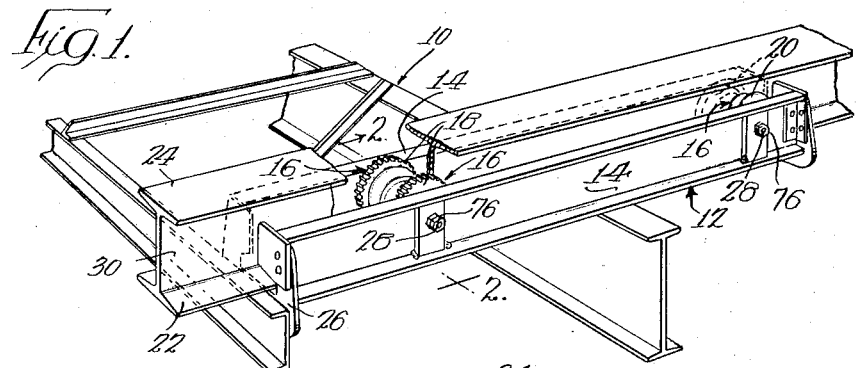
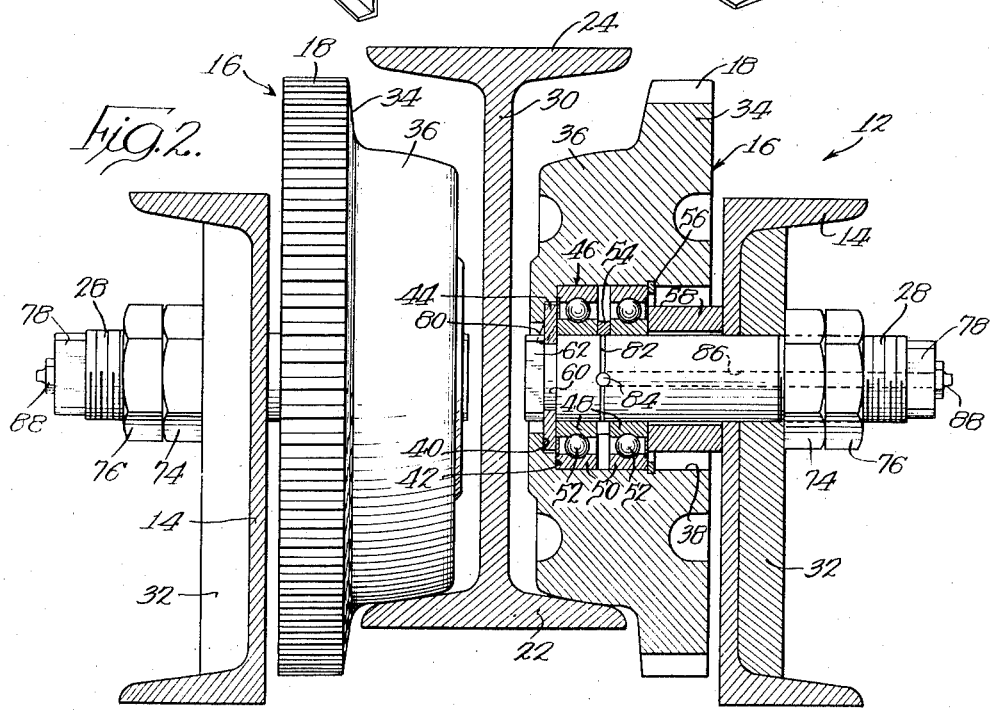
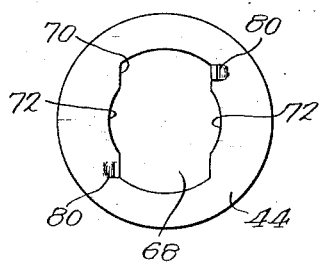
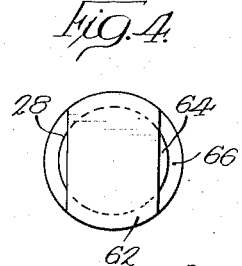
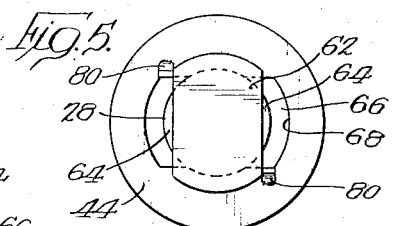
INVENTOR.
Carl Ellis Nyblom
BY Brown, Jackson, Boettcher & Dienner
Attys

United States Patent Office 2,861,850
Patented Nov. 25, 1958

2,861,850

WHEEL AND AXLE ASSEMBLY

Carl Ellis Nyblom, Chicago, Ill., assignor to Abell-Howe Company, Chicago, Ill., a corporation of Illinois Application March 16, 1956, Serial No. 571,912

6 Claims. (Cl. 308—236)

The present invention relates to wheel and axle assemblies, and particularly, to an improved wheel and axle construction accommodating assembly and disassembly of the same in a position wherein the wheel is inaccessible and the axle is accessible from one end only.

By way of example, in underhung cranes, monorails and the like, juxtaposed crane supporting wheels are disposed to opposite sides of an I-beam track with the end faces of the wheels closely adjacent the web of the beam and the peripheries of the wheels riding on the upper surfaces of the lower flange of the beam. Each wheel is closely confined axially thereof between the web of the I-beam and the supporting member for the wheel assembly and is confined vertically between the flanges of the I-beam. The wheel is substantially inaccessible, its removal being accommodated only lengthwise of the beam, or upon lowering of the crane from the track. Each wheel is supported on an axle, and if the wheel is to be removed or the crane lowered, the axle must first be removed. However, the axle is physically accessible, and can be inserted into and removed from the wheel, only from the outer side of the supporting member for the wheel and axle assembly. If a conventional nut, removable C-washer, or the like were utilized on the end of the axle adjacent the I-beam to accommodate tightening of the shaft and retention of the wheel against axial movement, the nut or washer would not be accessible in the completed crane assembly and the axle could be removed only upon disassembly of the crane. On the other hand, if no abutment were provided on the end of the axle, so that the axle could be removed, the wheel would not be rigidly or accurately supported.

The object of the present invention is the provision of an improved wheel and axle assembly intended especially, but not solely, for installations of the character described, the assembly including an axle adapted to be locked in the axial direction to the wheel rigidly to support the wheel, and adapted to be removed from the wheel solely by manipulation of its exposed accessible end.

Another object of the invention is to provide an improved wheel and axle assembly including means on the wheel cooperable with the axle and rotatable relative thereto to accommodate insertion of the axle through the wheel and said means in one position of relative rotation, and to retain said axle against axial movement at least in the direction of removal of the axle in another position of relative rotation, the axle being manipulated for rotary and axial movement solely from the accessible end thereof.

A further object is the provision of an improved assembly as described wherein said means comprises a washer having an opening therethrough of irregular shape in relation to the axle for cooperation with a complementary end portion of the axle.

More specifically, it is an object of the invention to provide an improved assembly as set forth wherein the washer is retained against axial movement in the wheel, and the axle has a circumferential groove adjacent one end of a thickness at least equal to that of the washer and an end portion outwardly of the groove complementary to the opening in the washer, the end portion of the axle being axially insertable through the washer and being rotatable to confine the washer between opposed radial portions of the axle to opposite sides of the groove, thus to retain the axle, washer and wheel against relative axial movement.

An additional object of the invention is the provision of an improved wheel and axle assembly as defined wherein the washer and said portion of the axle include cooperable means positively defining two positions of relative rotation wherein the washer and axle are locked together and wherein the axle may be moved axially.

A still further object is to provide an improved assembly as described wherein the washer has bearing on the axle to insure concentricity and alignment of the components of the assembly.

It is also an object of the invention to provide an improved wheel and axle assembly of economical and practical construction facilitating assembly and disassembly of the wheel.

Other objects and advantages of the invention will become apparent in the following detailed description of a preferred embodiment of the invention.

Now, in order to acquaint those skilled in the art with the manner of making and using my improved wheel and axle assembly, I shall describe, in connection with the accompanying drawing, a preferred embodiment of the invention and a preferred manner of making and using the same.

In the drawings:

Figure 1 is a fragmentary perspective view of a crane and one of its supporting tracks showing one application of the wheel and axle assembly of the invention;

Figure 2 is a fragmentary vertical section, on an enlarged scale, of the crane and track, the view being taken substantially on line 2—2 of Figure 1 and showing one of the wheel and axle assemblies in cross section;

Figure 3 is an end elevation of the axle locking washer;

Figure 4 is an end elevation of the axle; and

Figure 5 is an end elevation of the axle and washer as assembled.

Referring now to the drawings, and particularly to Figure 1, I have shown part of an underhung crane wherein my improved wheel and axle assembly has particular but not exclusive application. As shown, the crane includes a frame 10 having an end truck 12 comprised of spaced parallel upright channels 14. While only one end truck is shown, it is to be understood that end trucks are provided at opposite ends of the frame 10 movably to support the crane on its tracks. The channels 14 of each end truck are disposed closely adjacent one another and support thereon two pair of juxtaposed wheel and axle assemblies 16, namely a pair of drive wheels 18 and a pair of idler wheels 20. The drive wheels 18 are provided with gear teeth to be driven in a conventional manner by a motor and gear assembly (not shown) mounted on the frame. The wheels 18 and 20 are adapted to ride at their peripheries on the lower flange 22 of a crane supporting I-beam track 24 which extends longitudinally between the wheels of each pair and the channels 14. To rigidify each end truck, U-shaped end plates 26 extend around and below the I-beam 24 at each end of the truck.

In the completed assembly, as shown in Figures 1 and 2, each of the wheels 18 and 20 is confined vertically between the two flanges of the I-beam, and axially therebetween the opposed webs of the I-beam 24 and the wheel supporting channel 14. The wheels thus are substantially inaccessible. Each wheel is mounted on an axle 28 which in turn is mounted on and protrudes horizontally through the respective channel 14 of the truck frame. The axle cannot protrude or be moved appreciably beyond the end face of the wheel, due to the proximity of the web 30 of the I-beam, and is not accessible at that end of the wheel. Thus, the only portion of each assembly that is accessible, is that end of the axle that protrudes to the outer side of the channel 14.

The object of the present invention is the provision of an improved wheel and axle assembly intended particularly for installations of the character described, the assembly providing means rigidly or firmly supporting the wheel and yet accommodating ready assembly and disassembly of the wheel by manipulation solely of the one accessible end of the wheel axle. For purposes of convenience in describing the wheel and axle assembly per se, the end portion of the axle mounted on the channel will be referred to as the inner end thereof, and the portion of the axle mounting the wheel will be referred to as the outer end thereof, even though the outer face of the wheel as thus described is disposed inwardly with respect to the crane truck and track. To assure rigid support for the axle, each channel 14, at each wheel location, is provided with a reenforcing plate 32, the plate and the web of the channel being commonly bored conformably to receive the axle. In the preferred assembly as shown, the axle is to be fixedly secured to the channel 14 and the wheel is rotatably mounted thereon. In such assembly, the axle 28 is preferably of uniform diameter throughout substantially its full length, and is provided with certain grooves and bores as will be described in detail hereinafter.

Each of the wheels 18 and 20 preferably comprises a unitary casting including a radial flange 34 at the inner side thereof and a generally frusto-conical hub portion 36. The flange 34 of each drive wheel 18 is toothed to define a drive gear as previously described, while the flanges 34 of each idler wheel 20 may be left plain. The hub 36 comprises the wheel surface and rides on the flange 22 of the track 24. Each wheel is provided with a stepped axial bore 38 defining a pair of radially and axially offset shoulders 40 and 42 adjacent the outer end of the wheel. A circular washer 44, to be described in greater detail, is rotatably mounted within the bore 38 adjacent the outer end thereof, the washer engaging on the radially inward and axially outward shoulder 40.

The wheel is rotatably mounted on the axle 28 by bearing means 46, preferably comprising a pair of bearings having inner and outer races 48 and 50, respectively, an anti-friction means 52, such as balls, or cylindrical or tapered rollers, therebetween. The inner races 48 of the bearings are preferably spaced apart, suitably by a split ring 54, and the outer races 50 are confined within the bore 38. The outer race 50 of the outer bearing engages against the radially outward and axially inward shoulder 42 in the wheel, and the outer race of the inner bearing is retained within the wheel by means of a split locking ring 56 fitting within a circumferential groove in the bore 38 of the wheel. The bearings are thus secured in the wheel against axial movement. The spacing ring 54 biases the inner races 48 of the bearings apart, while the outer races 50 are biased toward one another by the ring 56 to eliminate bearing end play.

With the wheel assembled as described, the washer 44 is rotatably mounted, but confined against axial movement, between the shoulder 40 and the inner race of the outer bearing. To space the wheel from the web of the channel 14, a cylindrical spacer 58 engaging the inner race of the inner bearing is provided. Spacers of various lengths may be provided to space the wheel a proper distance from the channel 14 depending upon the width of the flange of the I-beam track employed.

The axle 28 has a maximum outer diameter equal substantially to the inner diameter of the inner races 48 of the bearings, and the bore in the channel 14 and end plate 32 is preferably of substantially equal diameter. The axle thus is axially slidable through the plate 32, channel 14 and the inner races of the bearings from the outer side of the crane truck. Adjacent its outer end, the axle is provided with a circumferential groove 60 of a thickness slightly greater than the thickness of the washer 44. Outwardly of the groove 60, the axle includes a head 62 of irregular shape with respect to the major portion of the axle and/or the base circle of the groove 60, the said head including portions extending radially outwardly of the base of the groove but not to an extent greater than the inner diameter of the bearing races 48. The head 62 may be eccentric with respect to the axis of the shaft, or may otherwise be of irregular form to define edge portions aligned generally with the base of the groove 60 and other portions extending radially outwardly of the groove. As shown in Figure 4, the head 62 in the preferred embodiment of the invention is of generally rectangular form having a longitudinal dimension equal to the diameter of the axle and a transverse dimension less than the base circle of the groove 60, whereby arcuate portions 64 of the reduced section of the axle defined by the groove are exposed to opposite sides of the head, and a radial end face 66 is exposed on the major portion of the axle.

The washer 44 is provided with an opening 68 therein complementary to the combined end elevation or configuration of the axle head 62 and the base of the groove 60. In the preferred embodiment, as shown in Figure 3, the opening in the washer includes a rectangular portion 70 complementary to the head 62, and at portions thereof aligned with the transverse axis of the rectangle is provided with arcuate cutouts 72 of a diameter equal substantially to the diameter of the base circle of the groove 60, whereby the cutouts complement the portions 64 of the axle.

In use, as the outer end portion of the axle is inserted axially through the bearings, the head 62, when it is aligned with the opening or slot 68 in the washer, may be passed freely through the opening to dispose the head to the outer side of the washer. As the head is passed through the washer, the portions 64 of the axle engage in the cutouts 72 to center the washer on the axle and dispose the same concentrically in the groove 60. The washer in turn abuts against the end face 66 to define the limit of outward movement of the axle. The washer 44 is thus disposed rotatably in the groove 60 with the edges of the cutouts 72 bearing on the base circle of the groove. The axle 28 may then be rotated relative to the washer to dispose the rectangular head 62 at right angles to the rectangular portion 70 of the washer opening 68, as shown in Figure 5, whereupon portions of the washer are confined between opposed radial shoulders on the axle to opposite sides of the groove to confine the washer and axle against relative axial movement.

To lock the axle in the described position, a nut 74 is threaded on the exposed inner end of the axle to the exterior of the channel 14. The nut when tightened on the axle bears against the plate 32 and draws the axle inwardly. Since the washer is retained against axial movement, the washer is drawn tightly against the inner race of the outer bearing; the inner races of the two bearings are drawn together on the spacer 54 and the spacer 58 is fixedly confined between the inner race of the inner bearing and the web of the channel 14. The axle is thus fixedly secured to the channel 14 and rigidly supports the washer, the inner races of the bearings and the spacers 54 and 58. The wheel in turn is rotatably supported on the rigid axle assembly and rigidly retained thereon against axial movement by the bearing means 46 and lock ring 56. Fixedly to secure the components of the assembly in the defined relationship, a jam nut 76 is also threaded on the inner end of the axle, the axle at its end having a reduced shank 78 of polygonal form for receiving a wrench to facilitate tightening and loosening of the nuts 74 and 76.

When it is desired to remove or replace a wheel, it is only necessary to loosen the nuts 76 and 74, whereupon the axle 28 may be grasped at its free end, rotated to dispose the head 62 in alignment with the slot or opening 68, and axially withdrawn from the washer, bearings and spacers. The wheel is thus freed for removal longitudinally of the I-beam track 24, or in any other suitable manner. The assembly of the same or a new wheel is readily effected in reverse manner.

To facilitate disposition of the head 62 of the axle in proper relation to the opening 68 in the washer, the washer and head preferably include cooperable means defining the aligned and disaligned positions of the head and washer. As shown particularly in Figures 2, 3 and 5, the washer 44 includes a pair of tabs or projections 80 punched outwardly of the washer from diametrically opposite corners of the rectangular opening therein. These tabs cooperate with the flat edges of the rectangular head 62 when the head is disposed outwardly of the washer to limit relative rotation of the two to about 90 degrees, from a first position wherein the head and opening are aligned to a second position wherein the head is disposed substantially at right angles to the opening. The tabs are preferably provided on the washer so that the head engages the tabs in the said second position in the direction in which the axle tends to rotate upon tightening of the nut 74, thus to insure proper assembly of the wheel and axle components.

In addition, in the complete assembly, the axle 28 preferably includes a circumferential groove 82 aligned with the split ring spacer 54, a radial bore 84 communicating with the groove and an axial bore 86 extending between the bore 84 and the inner or accessible end of the axle. A lubrication fitting 88 is secured at the outer end of the bore 86 to facilitate the supply of lubricant to the bearing means 46, grease pumped through the fitting flowing through the bores 86 and 84 to the groove 82, and from there through the split in the spacing ring 54 to the races and anti-friction means 52 of the bearings. In cases where necessary, suitable seals may be provided to opposite sides of the two bearings. In the case of ball bearings as shown in the accompanying drawing, the bearings are shielded and do not require separate seals.

From the foregoing, it is to be appreciated that the present invention affords an improved wheel and axle assembly of highly economical and practical construction facilitating assembly and disassembly of the wheel in inaccessible places solely by manipulation of one end of the axle. All of the objects and advantages of the invention are thus shown to be obtained in a convenient, practical and economical manner.

While I have shown and described what I regard to be a preferred embodiment of my invention, it will be appreciated that various changes, rearrangements and modifications may be made therein without departing from the scope of the invention, as defined by the appended claims.

I claim:

1. In a wheel and axle assembly accommodating confinement of the wheel in a substantially inaccessible space with the axle extending to the exterior of the space through a support for the assembly, the axle at one end thereof including a journal portion insertable into and removable from an axial bore in the wheel through the support, the wheel normally being mounted for rotation on said journal portion and the axle being adapted to be secured to the support, the improvement comprising means facilitating assembly and disassembly of the axle relative to the wheel entirely from the exterior of the space within which the wheel is confined, said means comprising a member rotatably mounted in the bore in the wheel and retained therein against axial movement relative to the wheel, the axle at the free end of said journal portion having an end portion of irregular configuration relative to the remainder of the axle and a reduced portion immediately inwardly of said end portion for rotatably receiving said member, said member having an aperture therethrough complementary to said end portion of the axle in certain positions of relative rotation thereof to accommodate insertion and removal of said end portion therethrough, said aperture and said end portion in other positions of relative rotation thereof being non-complementary whereby said member and the wheel, when said member is received on said reduced portion of the axle, are retained against axial movement relative to the axle, the axle being manipulatable from the opposite, accessible end thereof to effect assembly and disassembly of the same with respect to said member.

2. In a wheel and axle assembly accommodating confinement of the wheel in a substantially inaccessible space with the axle extending to the exterior of the space through a support for the assembly, the axle at one end thereof including a journal portion insertable into and removable from an axial bore in the wheel through the support, the wheel normally being mounted for rotation on said portion and the axle being adapted to be secured to the support, the improvement comprising means facilitating assembly and disassembly of the axle relative to the wheel entirely from the exterior of the space within which the wheel is confined, said means comprising a member rotatably mounted in the bore of the wheel and retained therein against axial movement relative to the wheel, the axle at the free end of said journal portion having an end portion of irregular configuration relative to the reminder of the axle and a reduced portion immediately inwardly of said end portion for rotatably receiving said member, said member having an aperture therethrough complementary to said end portion of the axle in certain positions of relative rotation thereof to accommodate insertion and removable of the end portion through said aperture, said aperture and said end portion in other positions of relative rotation thereof being non-complementary whereby said member and the wheel, when said member is received on said reduced portion of the axle, are retained against axial movement relative to the axle, the axle being manipulaable from the opposite accessible end thereof to effect assembly and disassembly of the same with respect to said member, said member including abutment means in the path of relative rotary movement of said end portion for defining limits of relative rotation in opposite directions in one of which said aperture is complementary to said end portion and in the other of which said aperture is non-complementary to said end portion.

3. In a wheel and axle assembly accommodating confinement of the wheel in a substantially inaccessible space with the axle extending to the exterior of the space through a support for the assembly, the axle at one end thereof including a journal portion insertable into and removable from an axial bore in the wheel through the support, the wheel normally being mounted for rotation on said portion and the axle being adapted to be secured to the support, the improvement comprising means for facilitating assembly and disassembly of the axle relative to the wheel entirely from the exterior of the space within which the wheel is confined, said means comprising a member rotatably mounted in the bore in the wheel and retained therein against axial movement, the axle at the free end of said journal portion including an end portion having transverse dimensions no greater than the diameter of said journal portion and a circumferential groove immediately adjacent said end portion for rotatably receiving said member, said end portion being of irregular shape with respect to the remainder of said journal portion and including portions substantially aligned with the bottom of said groove and other portions extending radially outwardly of the bottom of said groove, said member having an opening therein complemental to said end portion of the axle in certain positions of relative rotation thereof to accommodate insertion and removal of said end portion through said opening, the edge of said opening including portions complementary to the bottom of said groove adapted to bear rotatably thereon, the axle being rotatable relative to said member to align and misalign said end portion with respect to said opening thereby to accommodate, respectively, detachment and detachable connection of said member and the axle by manipulation solely of the opposite, accessible end of the axle, said member when the axle is connected thereto retaining the wheel against axial movement relative to the axle, and means for locking said member to the axle.

4. In a wheel and axle assembly accommodating confinement of the wheel in a substantially inaccessible space with the axle extending to the exterior of the space through a support for the assembly, the axle at one end thereof including a journal portion insertable into and removable from an axial bore in the wheel through the support, the wheel normally being mounted for rotation on said portion and the axle being adapted to be secured to the support, the improvement comprising means facilitating assembly and disassembly of the axle relative to the wheel entirely from the exterior of the space within which the wheel is confined, said means comprising a member rotatably mounted in the bore in the wheel and retained therein against axial movement, the axle at the free end of said journal portion including an end portion having transverse dimensions no greater than the diameter of said journal portion and a circumferential groove immediately adjacent said end portion for rotatably receiving said member, said end portion being of irregular shape with respect to the remainder of said journal portion and including portions substantially aligned with the bottom of said groove and other portions extending radially outwardly of the bottom of said groove, said member having an opening therein complemental to said end portion of the axle in certain positions of relative rotation thereof to accommodate insertion and removal of said end portion through said opening, the edge of said opening including portions complementary to the bottom of said groove adapted to bear rotatably thereon, the axle being rotatable relative to said member to align and misalign said end portion with respect to said opening thereby to accommodate, respectively, detachment and detachable connection of said member and the axle by manipulation solely of the opposite accessible end of the axle, said member when the axle is connected thereto retaining the wheel against movement relative to the axle, and means for locking said member to the axle when the axle is connected thereto, said member including tabs projecting in the same direction as said end portion of the axle and disposed in the path of relative rotation of the radially extending portions thereof when said end portion is inserted through said opening, said tabs defining end limits of relative rotation of the axle and said member, said radially outwardly extending portions of said end portion overlying said member at one of said limits of relative rotation and being aligned with said opening at the other of said limits of rotation.

5. In a wheel and axle assembly accommodating confinement of the wheel in a substantially inaccessible space with the axle extending to the exterior of the space through a support for the assembly, the axle at one end thereof including a journal portion insertable into and removable from an axial bore in the wheel through the support, the wheel carrying bearing means for rotatably mounting the same on said portion of the axle, the bearing means having an outer race locked in said bore and an inner race normally mounted on the journal portion of the axle, and a spacer between said inner race and the support for spacing the wheel from the support, the axle at the end thereof disposed to the exterior of said space being adapted for reception of a fastener to secure the assembly to the support, the improvement comprising means facilitating assembly and disassembly of the axle relative to the wheel entirely from the exterior of the space within which the wheel is confined, said means comprising a washer losely confined in the bore in the wheel between an end wall of the wheel and the inner race of the bearing means to the side of said bearing means opposite said spacer to be retained thereby against axial movement relative to the wheel, the axle at the free end of said journal portion having a head comprising a transverse rectangular bar of a length equal substantially to the diameter of said journal portion and a width substantially less than said diameter, the axle also having a circumferential groove in said journal portion immediately inwardly of said head the root diameter of which is intermediate the length and width of said head, said washer having an aperture therethrough complementary to said head and the portions of the bottom of said groove extending radially outwardly of said head, the axle being rotatable relative to said washer to align said head relative to said aperture to accommodate axial insertion and removal of said head through said aperture, the axle, when said head and aperture are misaligned and said washer is recived in said groove, retaining said washer and the wheel against axial movement relative to the axle, the axle being manipulatable from the opposite, accessible end thereof to effect assembly and disassembly of same with respect to said washer and being adapted for reception of the said fastener to lock the axle, said washer, the inner race of the bearing means and the spacer to the said support.

6. In a wheel and axle assembly accommodating confinement of the wheel in a substantially inaccessible space with the axle extending to the exterior of the space through a support for the assembly, the axle at one end thereof including a cylindrical portion insertable into and removable from an axial bore in the wheel through the support, the wheel normally being mounted for rotation on said portion and the axle being adapted to be secured to the support, the improvement comprising means facilitating assembly and disassembly of the axle relative to the wheel entirely from the exterior of the space within which the wheel is confined, said means comprising a member rotatably mounted in the bore in the wheel and retained therein against axial movement, said member being mounted adjacent the face of the wheel opposite the said support, the axle at the free end of said journal portion including a relatively short end portion having transverse dimensions no greater than the diameter of said journal portion and a circumferential groove immediately inwardly of said end portion, said groove being of a width at least equal to the thickness of said member and being adapted for the rotatable reception of said member, said end portion being of irregular shape with respect to the remainder of said journal portion and including portions substantially aligned with the bottom of said groove and other portions extending radially outwardly of the bottom of said groove, said member having an opening therein complemental to the said end portion of the axle in certain positions of relative rotation of said member and the axle to accommodate insertion and removal therethrough of said end portion, said opening including portions complementary to the bottom of said groove, the axle to the side of said groove opposite said end portion being cylindrical and defining a radial shoulder engageable with said member for limiting insertion of the axle through said member and into the wheel, said shoulder being spaced from the free end of said journal portion a distance not appreciably greater than the distance between said member and the said face of the wheel, the axle being rotatable relative to said member to align and misalign said end portion with respect to said opening thereby to accommodate, respectively, detachment and detachable connection of said member and the axle by manipulation solely of the opposite, accessible end of the axle, said member when the axle is connected thereto retaining the wheel against appreciable axial movement relative to the axle and accommodating securement of the axle to its support, and means for securing the axle to its support and for locking said member to the axle when the axle is connected thereto, said member including tabs projecting toward the said face of the wheel and disposed in the path of relative rotation of said radially outwardly extending portions of said end portion when said end portion is inserted through said opening and said member engages in said groove, said tabs defining end limits of relative rotation of the axle and said member in one of which said radially extending portions overlie said member and in the other of which said end portion is aligned with said opening.

References Cited in the file of this patent

UNITED STATES PATENTS

| | | |
|---|---|---|
| 1,604,155 | Fenton et al. | Oct. 26, 1926 |
| 2,099,895 | Kendzierski | Nov. 23, 1937 |
| 2,584,610 | Pearson | Feb. 5, 1952 |

UNITED STATES PATENT OFFICE
CERTIFICATE OF CORRECTION

Patent No. 2,861,850                      November 25, 1958

Carl Ellis Nyblom

It is hereby certified that error appears in the printed specification of the above numbered patent requiring correction and that the said Letters Patent should read as corrected below.

Column 6, line 32, for "reminder" read -- remainder --; line 43, for "manipulaable" read -- manipulatable --.

Signed and sealed this 10th day of March 1959.

(SEAL)
Attest:

KARL H. AXLINE                                   ROBERT C. WATSON
Attesting Officer                               Commissioner of Patents